Figure 1:
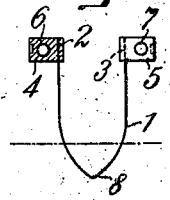

O. FISCHER.
THERMIC TELEPHONE.
APPLICATION FILED MAR. 19, 1914.

1,174,554.

Patented Mar. 7, 1916.
2 SHEETS—SHEET 1.

Witnesses:
Charles A. Mathé
Wm. J. Browne

Inventor
Otto Fischer
by John Lotka
Attorney.

O. FISCHER.
THERMIC TELEPHONE.
APPLICATION FILED MAR. 19, 1914.
1,174,554.
Patented Mar. 7, 1916.
2 SHEETS—SHEET 2.
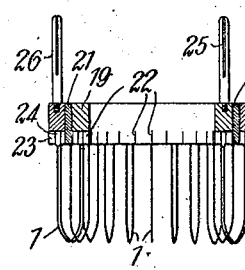
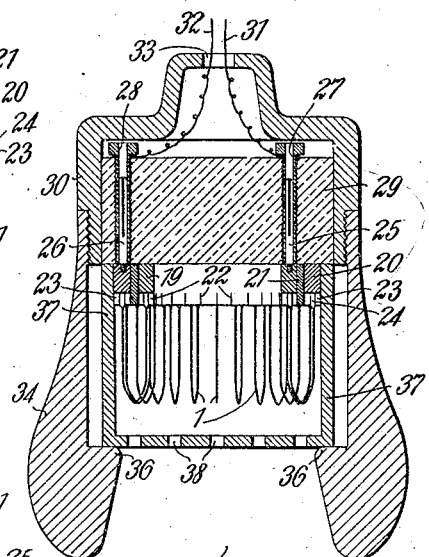
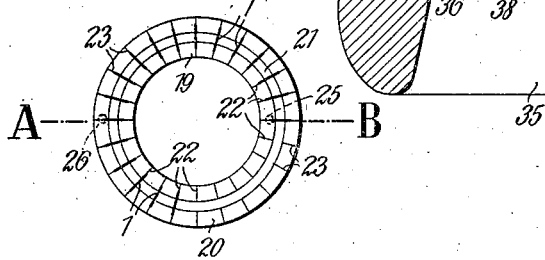
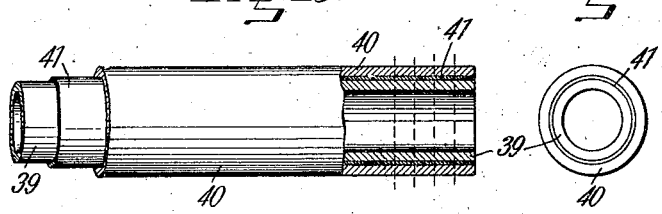
Witnesses:
Charles A. Mathé
Wm. J. Browne
Inventor
Otto Fischer
by John Lotka
Attorney.

UNITED STATES PATENT OFFICE.

OTTO FISCHER, OF UTRECHT, NETHERLANDS, ASSIGNOR TO NAAMLOOZE VENNOOT-SCHAP DE NEDERLANDSCHE THERMO-TELEPHOON MAATSCHAPPIJ, OF UTRECHT, NETHERLANDS, A CORPORATION OF THE NETHERLANDS.

THERMIC TELEPHONE.

1,174,554.      Specification of Letters Patent.      Patented Mar. 7, 1916.

Application filed March 19, 1914. Serial No. 825,934.

*To all whom it may concern:*

Be it known that I, OTTO FISCHER, a subject of the German Emperor, and a resident of Utrecht, Netherlands, have invented certain new and useful Improvements in Thermic Telephones, of which the following is a specification.

My invention relates to thermic telephones, and particularly to the heat-conductors thereof and to the carriers of such conductors. Heat-conductors of this character have been made heretofore from wires (say platinum wires) coated according to Wollastone's method and formed into the shape of loops, the bend of the loop being then dipped into acid to a depth corresponding to that of the receiver, and thus freed of the coating on the dipped portion. In the usual practice, the Wollastone wire, after being bent into loop-form, is provided with a cast or block-like inclosing body made of acid-proof insulating material, only that portion of the wire which is to be treated with acid, being allowed to project from the said block or carrier. In the operation of this process, considerable difficulties have been experienced owing to the fact the exceedingly fine wire loop projecting from the carrier or cast was bent sidewise, when lifted from the acid bath, by the amount of acid adhering to said carrier, so that it became necessary to bend the loop back to its proper position, and this righting of the fine loop frequently caused it to become injured.

According to my invention, this defect is avoided by providing the loops which are to be treated with acid, with holders at their free ends, and connecting these Wollastone wires with a carrier, and, suspended from this carrier, the wires are dipped in the acid bath to the desired extent. When a heat conductor of this character is lifted from the acid bath, the acid will run off readily from the wire loops, and the sound-producing, very sensitive wire loops will not be deformed.

The free ends of the wire loops may be detachably fastened directly in closely set holes of a holder which at the same time forms a carrier common to all the wires. This arrangement permits of simplifying greatly the construction of a heat conductor composed of a large number of wire loops, without the use of a body cast around a portion of the wires. These holders common to all the wires are readily accessible and serve not only to carry the wires during the dipping operation, but in the telephone casing as well.

It is well-known that combining a plurality of wire loops to form a single heat conductor, materially increases the acoustic effect of the thermic telephone containing such heat conductor. Thermic telephones, however, are made of very small dimensions, their receivers being adapted to be fitted against the auditory meatus directly; on account of these small dimensions, considerable practical difficulties are experienced in providing a large number of heat conductors or thermic wires in a thermic telephone.

The "casting" method referred to above has indeed been used for the production of thermic conductors comprising a plurality of wire loops connected in groups by metal bars and embedded in a cast common to them. Inasmuch, however, as in this construction the wire loops were connected with each other permanently, the entire heat conductor body became unserviceable in case even one of the very delicate wire loops was injured either during the dipping process or during the subsequent use of the heat conductor, and this was a serious drawback of said older construction.

It is a further object of my invention to avoid the defect just noted, that is to say, to provide a carrier for a thermic conductor which will allow a very large number of wire loops to be placed within a small space, while in the event of injury to one or more of the loops, the damaged loop can be removed separately in a convenient manner, without disturbing the other wire loops. In order to accomplish this result, I employ, as a carrier for the thermic conductor, a ring-shaped holder in which the radially arranged wire loops are set removably. This not only simplifies the construction of the heat conductor, but facilitates the acid treatment of the several wire loops arranged in groups.

Reference is to be had to the accompanying drawings, in which—

Figure 5:
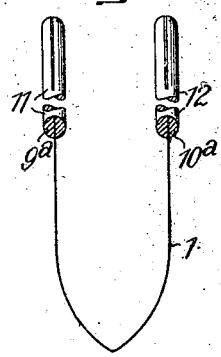
Figure 6:
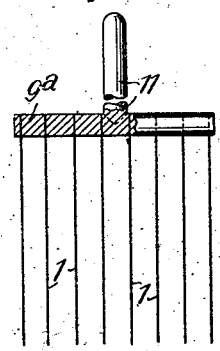
Figure 2:
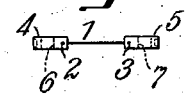
Figure 3:
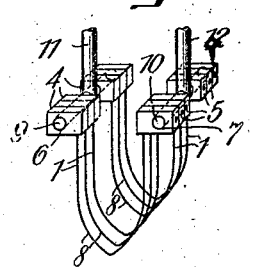
Figure 7:
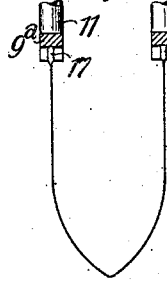
Figure 8:
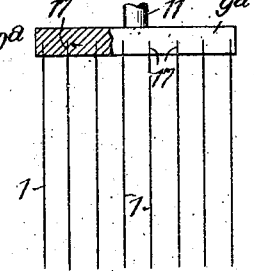
Figure 4:
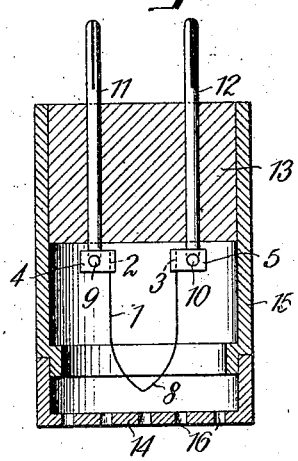
Figure 9:
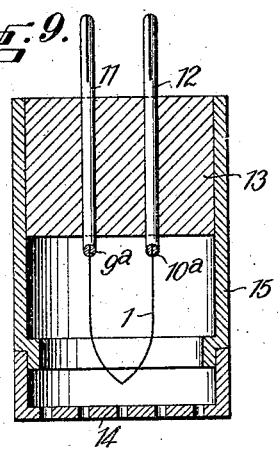

Figure 1 is an elevation, partly in section, of one form of thermic conductor made according to my invention; Fig. 2 is a plan view of said thermic conductor; Fig. 3 is a perspective view of a thermic conductor consisting of a plurality of wire loops mounted on carriers; Fig. 4 is an axial section of a telephone receiver containing a thermic conductor of the construction shown in Fig. 3; Fig. 5 is a side elevation, with parts in section, and Fig. 6 a front elevation, with parts in section, of another form of thermic conductor made according to my invention; Figs. 7 and 8 are respectively a side elevation and a front elevation, each with parts in section, showing still another form of heat conductor according to my invention; Fig. 9 is a longitudinal section through a telephone containing a heat conductor of the character shown in Figs. 5 and 6; Fig. 10 is a vertical section, taken on line A—B of Fig. 11, showing an annular carrier for the heat conductor; Fig. 11 is a bottom view of the arrangement shown in Fig. 10, with some of the wire loops omitted; Fig. 12 is a vertical section through a thermic telephone intended for persons hard of hearing, said telephone receiver containing wire loops and a carrier of the construction shown in Figs. 10 and 11; and Figs. 13 and 14 are respectively a side elevation with parts in section, and an end view illustrating a special process for the manufacture of an annular carrier of the kind embodied in Figs. 10, 11 and 12.

All the figures of the drawing show the parts larger than natural size.

In the construction illustrated by Figs. 1 and 2, the loop-shaped Wollastone wire 1 is passed at each end 2, 3 through a holder 4, 5 respectively made of electrically conducting material, with which said wire ends are connected in any suitable manner, as by soldering or riveting. The holders 4, 5 are provided with holes 6, 7 respectively. The thermic conductor formed in this way is, while hanging freely in the position shown, dipped in an acid bath to the desired depth, as indicated by the dotted horizontal line in Fig. 1, so that the dipped portion 8 of the loop is freed of its coating, thus exposing the platinum core, in the usual manner of treating Wollastone wires.

In Fig. 3 I have shown a thermic conductor comprising a plurality of wire loops, and in this case the wire loops 1, before dipping them into the acid bath, are secured to holders 4, 5 in the same manner as described above, and then strung on carriers 9 and 10 respectively which pass through the holes 6, 7 respectively. The number of wire loops in each group depends on the strength or aggregate cross section it is desired to give to the thermic conductor. For the purpose of connecting the wire loops with the circuit, the carriers 9 and 10 are provided or connected with rods 11, 12 respectively adapted to receive snap-on connectors of a well-known character.

The mounting of the thermic conductor is preferably carried out in the manner shown in Fig. 4. The connector members 11, 12 are embedded in a block 13 of insulating material, which is surrounded by a casing or shell 15, the open end of which may be closed by a cover 14 having apertures 16 for the passage of the sound.

It will be seen that each wire loop 1, with the small holders 4, 5 at its ends, is removable readily from the carriers 9, 10 on which the wire loops with their attached holders are strung; these loops may therefore be removed and replaced with the greatest ease.

In the construction illustrated by Figs. 5 to 9 inclusive, the holders 9$^a$, 10$^a$ form common carriers for the respective ends of all the wire loops 1 and at the same time constitute T-shaped bodies in conjunction with the connector rods or pins 11, 12 respectively. These carriers are provided either with closely set holes (Figs. 5 and 6) or with slits (Figs. 7 and 8) for the reception of the ends of the wire loops 1, said ends being preferably flattened, in the construction shown in Figs. 7 and 8, as indicated at 17, 18, and being inserted in the slits either laterally or from below. The construction of the thermic conductors is greatly simplified in this manner, since the free ends of the wire loops 1 are inserted directly in the holders 9$^a$, 10$^a$ forming carriers for said wires, and if required, the wire ends may be secured say by soldering or riveting. The cross section of the holders 9$^a$, 10$^a$ may be varied, thus in Figs. 5 and 6 a circular cross section is shown, while in Figs. 7 and 8 the holders are of rectangular cross section. The length of the holders 9$^a$, 10$^a$ of course depends on the number of wire loops to be used, and this again depends on the desired strength or aggregate cross section of the thermic conductor. Here too, the several wire loops 1 are detachable individually from the carriers 9$^a$, 10$^a$ on which they are strung.

The complete receiver containing a thermic conductor of the construction shown in Figs. 7 and 8 is illustrated in Fig. 9, and has the connector rods or pins 11, 12 embedded in a block 13 of insulating material, surrounded by a shell 15 closed by a perforated cover 14, in the same manner as described with reference to Fig. 4.

The heat conductor carrier shown in Figs. 10 and 11 consists of a ring-shaped holder comprising an inner metal ring 19, an outer metal ring 20, and an insulating ring 21 interposed between them. On their lower faces, the metal rings 19, 20 are provided with radial openings 22, 23 respectively, which in the particular form illustrated are made as slits or notches. The (preferably flattened) free ends 24 of the wire loops 1 are inserted detachably in said openings.

The annular holder 19, 20, 21 connects the wire loops 1 to form an annular group, and this holder, with the loops hanging down from it freely, is moved downward until the lower portions of the wire loops are dipped to the desired extent in the acid bath to remove the coating of the wires in the well-known manner. It will be seen that the acid-treatment is carried out without requiring a "cast" connecting the several wire loops, and thus I am enabled not only to regulate the depth of dipping accurately and easily, but to dip the wires to a considerably greater depth than with the method used hitherto, since the height of the holder 19, 20, 21 is much smaller than that of the "cast" employed hitherto.

If during the acid treatment one or more wire loops 1 should be damaged, they can be readily removed, individually, by simply pulling them out of the metal rings 19, 20, whereupon sound, previously dipped wire loops will be substituted for the damaged ones.

For the purpose of making the necessary electrical connections, the metal rings 19, 20 are provided or connected with rods or pins 25, 26 respectively adapted to receive snap-on connections of the well-known character, as indicated at 27, 28 in Fig. 12, the sleeves 27, 28 fitting over the elastic (split) ends of the rods 25, 26 respectively, and serving also to hold the rings 19, 20, 21. These sleeves 27, 28 are screwed into openings of an insulating block 29, fitted into a shell or casing 30, the upper end of which has a central opening 33 for the passage of the connecting wires 31, 32 secured to the sleeves 27, 28 respectively. On the casing 30 is screwed a sleeve 34, preferably pear-shaped and provided with a sound opening 35. The interior shoulder 36 of the sleeve 34 presses against the protecting cover 37 which surrounds the wire loops, and thus the said cover is held against the block 29. At its lower end, the cover 37 is provided with apertures 38 registering with the sound opening 35.

With a heat conductor carrier of the construction described above, it is very easy to remove from the thermic telephone, any wire loop 1 which may have become defective, without disturbing the other loops. All that is necessary to effect this, is to unscrew the sleeve 34, pull off the cover 37 with the connector rods 25, 26 from the sleeves 27, 28, and remove the defective wire or wires 1 from its or their sockets in the metal rings 19, 20; new wire loops are then inserted, and the parts put together as before.

The annular holders forming the carrier for the heat conductor are preferably manufactured, in the manner illustrated by Figs. 13 and 14. According to this process of manufacture, two metal tubes 39, 40 and an interposed tube 41 of insulating material are put together telescopically, as shown. From the composite tube thus formed, annular sections are cut off, as indicated by the vertical dotted lines in Fig. 13. By means of a milling cutter, these annular bodies are then provided, on one of their end faces, with the radial cuts or slits for receiving the ends of the wire loops. This method allows me to manufacture the annular heat conductor carriers very accurately, notwithstanding their small dimensions, and in an economical manner suited for production on a large scale.

Various modifications may be made without departing from the nature of my invention as set forth in the appended claims.

I claim:

1. In a thermic telephone, a series of wire loops, and a carrier with which the individual loops are connected detachably.

2. A heat conductor carrier for thermic telephones, comprising an annular member adapted to form a part of the telephone and consisting of an inner metal ring, an outer metal ring, and a ring of insulating material interposed between said metal rings, the latter two rings being provided with radial openings for the removable insertion of the free ends of the thermic wire loops.

3. A thermic telephone comprising a casing, a carrier set therein and consisting of two annular conducting members insulated from each other and provided with openings, and wire loops the ends of which are secured to the respective conducting members at the openings thereof.

4. A thermic telephone comprising a casing, a carrier set therein and consisting of two conducting rings of different diameters and a ring of insulating material interposed between said conducting rings, the latter being provided with openings, and wire loops the ends of which are secured removably in the openings of the respective conducting rings.

In testimony whereof, I have signed this specification in the presence of two subscribing witnesses.

OTTO FISCHER.

Witnesses:
C. HILDERING,
D. KLEYN.